United States Patent

Baudouin

[11] Patent Number: 5,974,193
[45] Date of Patent: Oct. 26, 1999

[54] RELATING TO NOISE REDUCTION

[75] Inventor: Charles A. Baudouin, Hampshire, United Kingdom

[73] Assignee: NDS Limited, Middlesex, United Kingdom

[21] Appl. No.: 08/777,715

[22] Filed: Dec. 20, 1996

[30] Foreign Application Priority Data

Jan. 8, 1996 [GB] United Kingdom .................. 9600293

[51] Int. Cl.⁶ .............................. G06K 9/40; G06T 5/00; H04N 1/409
[52] U.S. Cl. .......................... 382/261; 382/263; 382/266; 382/275; 358/463
[58] Field of Search .................................... 382/260, 261, 382/263, 264, 275, 236, 238, 248, 250; 358/463, 432, 433; 348/607, 606, 403, 406, 409, 420

[56] References Cited

U.S. PATENT DOCUMENTS

| | | | |
|---|---|---|---|
| 3,908,114 | 9/1975 | White | 364/725.01 |
| 5,038,388 | 8/1991 | Song | 382/26 |
| 5,313,301 | 5/1994 | Lee | 348/607 |
| 5,392,137 | 2/1995 | Okubo | 358/462 |
| 5,550,789 | 8/1996 | White | 375/346 |
| 5,717,789 | 2/1998 | Anderson | 382/260 |
| 5,748,796 | 5/1998 | Pennino et al. | 382/260 |
| 5,825,937 | 10/1998 | Ohuchi et al. | 382/261 |

FOREIGN PATENT DOCUMENTS

| | | |
|---|---|---|
| 0 167 387 A2 | 1/1986 | European Pat. Off. . |
| 0 278 786 A1 | 8/1988 | European Pat. Off. . |
| WO-88/07800 A1 | 10/1988 | European Pat. Off. . |
| 2 209 448 | 9/1988 | United Kingdom . |

*Primary Examiner*—Scott Rodgers
*Attorney, Agent, or Firm*—Proskauer Rose LLP

[57] ABSTRACT

Edge Enhanced Noise Reduction (EENR) is a frequency dependent instantaneous compander system. It is applied only in the encoder both to Chrominance and luminance, and is best placed after the horizontal and vertical down sampling filters in the pre-processing stages of an encoder (not shown per se). High frequency, low level information (mainly noise) are reduced significantly in amplitude. In particular, EENR is designed to preserve edge details. In addition, a vertical recursive filter can be used to prevent low level vertical information from being removed by the system. This is partially useful in the luminance path. High level, high frequency components remain virtually unaffected. The system is 'transparent' to low frequency information. EENR has been designed to work in conjunction with MPEG encoding presented with source material which is slightly noisy and where the transmission bit rate is being constrained. It has been designed to provide minimal loss in picture quality due to the noise reduction process itself. It is not necessary to provide a complementary process in the receiver.

18 Claims, 5 Drawing Sheets

"f2.res"—

"fh.res"—
"fl.res"—

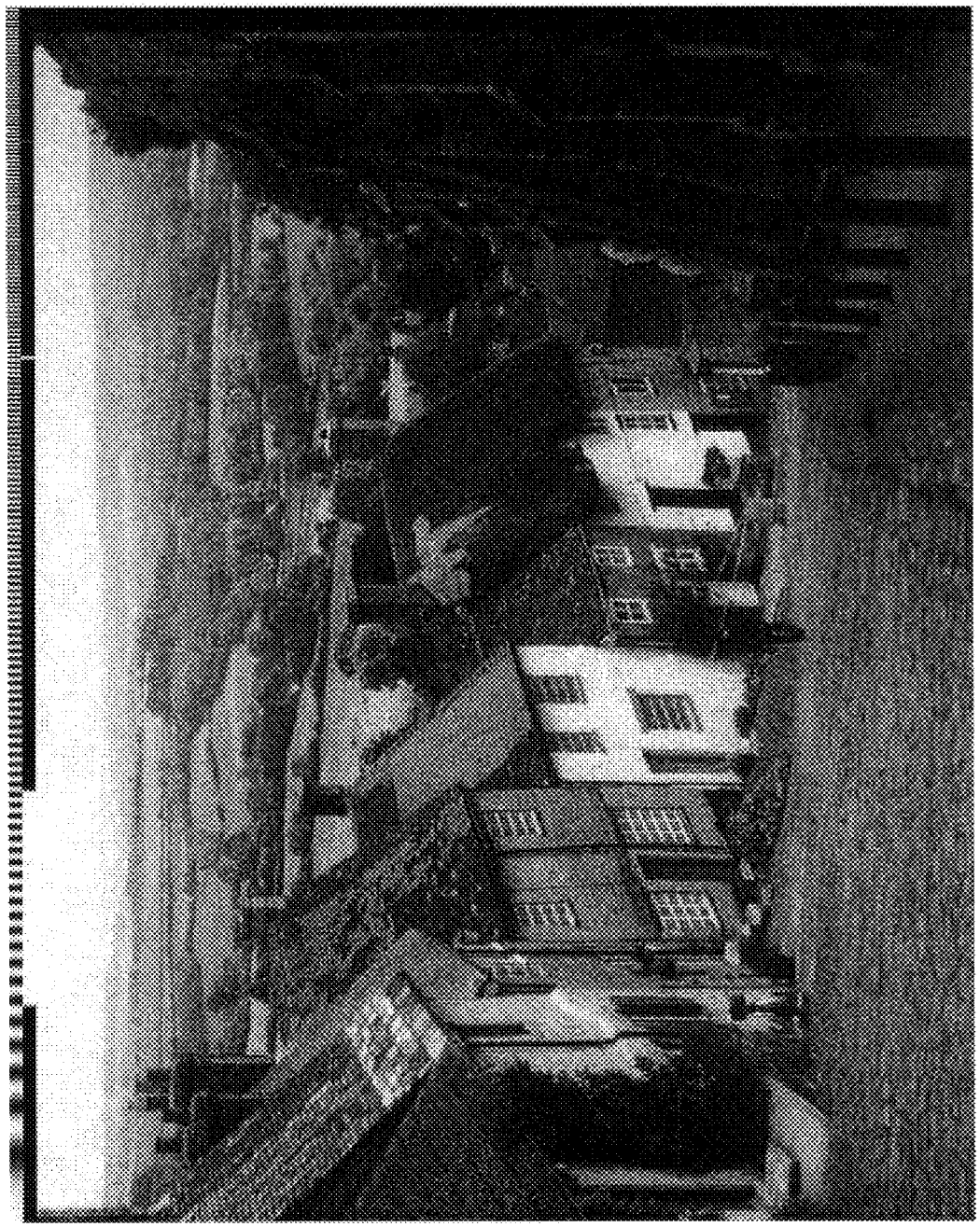
Figure 7: MPEG encoding of 'Goldhill' without EENR

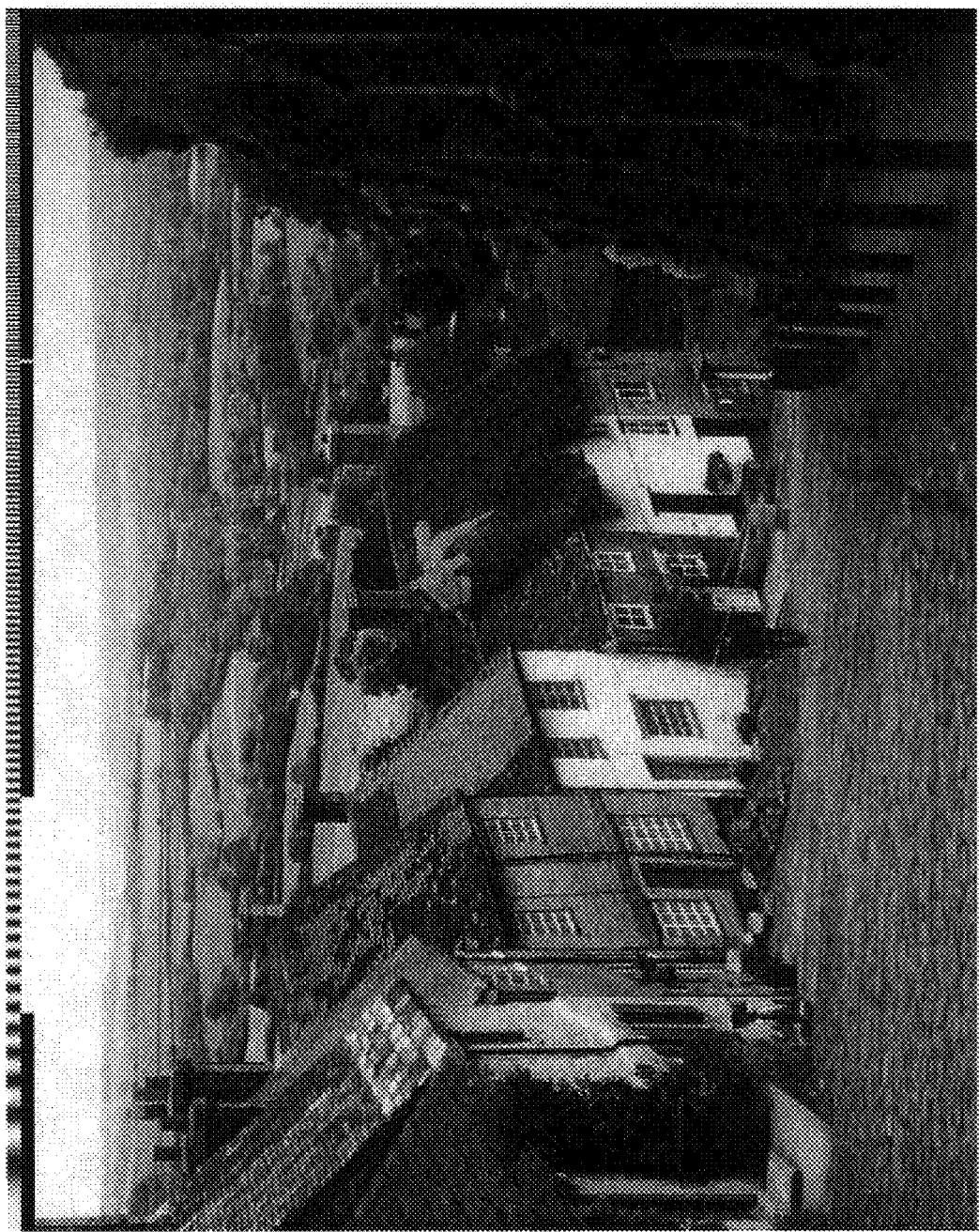
Figure 8: MPEG encoding of 'Goldhill' with EENR

RELATING TO NOISE REDUCTION

FIELD OF THE INVENTION

This invention relates to noise reduction for video signal processing, in particular to noise reduction for MPEG I and II encoding of video signals.

BACKGROUND OF THE INVENTION

MPEG stands for Moving Picture Experts Group and it represents an ISO/IEC standards group developing standards for the compression of moving pictures and associated information. MPEG I and MPEG II are two such standards.

An MPEG transmission system allows several video, audio and associated services to be multiplexed and sent over a single digital transmission channel. The number of services and hence the cost of transmission bandwidth per service is determined by the bit rate. Any improvement in picture quality or reduction in bit rate is thus very important to a service provider.

Most sources of video produce random noise: camera noise, tape noise and the digital re-transmission of existing analogue services are typical examples of systems introducing noise. Although much of this noise is often biased towards the high frequency parts of the spectrum and are not particularly visible in an analogue system, MPEG encoding of such material often introduces Discrete Cosine Transform (DCT) effects or artefacts that 'crawl' around the picture.

There are two main reasons for these effects being produced. Firstly, the presence of noise causes many small amplitude high frequency DCT coefficients to be generated and sent in the bit stream. These coefficients tend to be more inaccurately quantised than the low frequency coefficients and are generally due to the noise only. The increase in the number of bits transmitted causes the Quantisation Parameters factor (QP) to become higher in order to maintain the same bit rate. The net result is that the whole picture is reduced in quality. The Forward Prediction (P) and Bi-directional prediction (B) frames that follow the Intra (I) frame try to constantly correct for the noise in the prediction path and so this results in the DCT artefacts changing from frame to frame. The second reason for the loss in picture quality is that the accuracy of the motion estimation is reduced with the presence of noise in the encoder itself. This produces even worse predictions in the 'B', and 'P' frames which inevitably increases the QP and reduces picture quality.

One object of the present invention is to provide a system which overcomes at least some of the limitations of the prior art and provides an improvement in performance over known systems.

SUMMARY OF THE INVENTION

According to one aspect of the present invention, there is provided a system for noise reduction comprising: a filter which can apply a first level of filtering to a first type feature of an image and a second level of filtering to a second type feature of the image; a control means for recognising the presence of the second type feature and causing the second level of filtering to be applied; and a means for applying a non-linearity, such that low level noise is reduced within the system.

The design produces a system where the edges of objects within a picture are preserved as compared to other low level details in the picture. The resulting picture, after it has been through an MPEG system, produces a subjective improvement when compared with the same picture having no noise reduction in accordance with the invention.

One embodiment of the invention provides a method of reducing noise in a video signal, comprising: pre-filtering the video signal; applying a controllable non-linearity which operates on the small amplitude components of the signal and applying a post-filter which operates on the resultant signal; such that the noise reduction effects on certain features are minimised.

Preferably the second features comprises edge elements of the image, such as vertical, horizontal or diagonal edges.

Advantageously the system further comprising a vertical recursive filter for reducing the degree of noise reduction applied to low amplitude vertical edges of the image and comprises a recursive line delay and a clipping function.

According to a second aspect of the invention, there is provide a method of reducing the noise comprising: applying a first level of filtering to a first type feature of an image and a second level of filtering to a second type feature of the image; recognising the presence of the second type feature and causing the second level of filtering to be applied to the image; and applying a non-linearity, such that low level noise is reduced within the system.

BRIEF DESCRIPTION OF THE DRAWINGS

Reference will now be made, by way of example, to the accompanying drawings, in which:

FIG. 7 is a photograph of a scene having undergone MPEG encoding without Edge Enhanced Noise Reduction; and FIG. 8 is a photograph of a scene in FIG. 7 having undergone MPEG encoding with Edge Enhanced Noise Reduction.

DETAILED DESCRIPTION OF THE INVENTION

Figure 1:
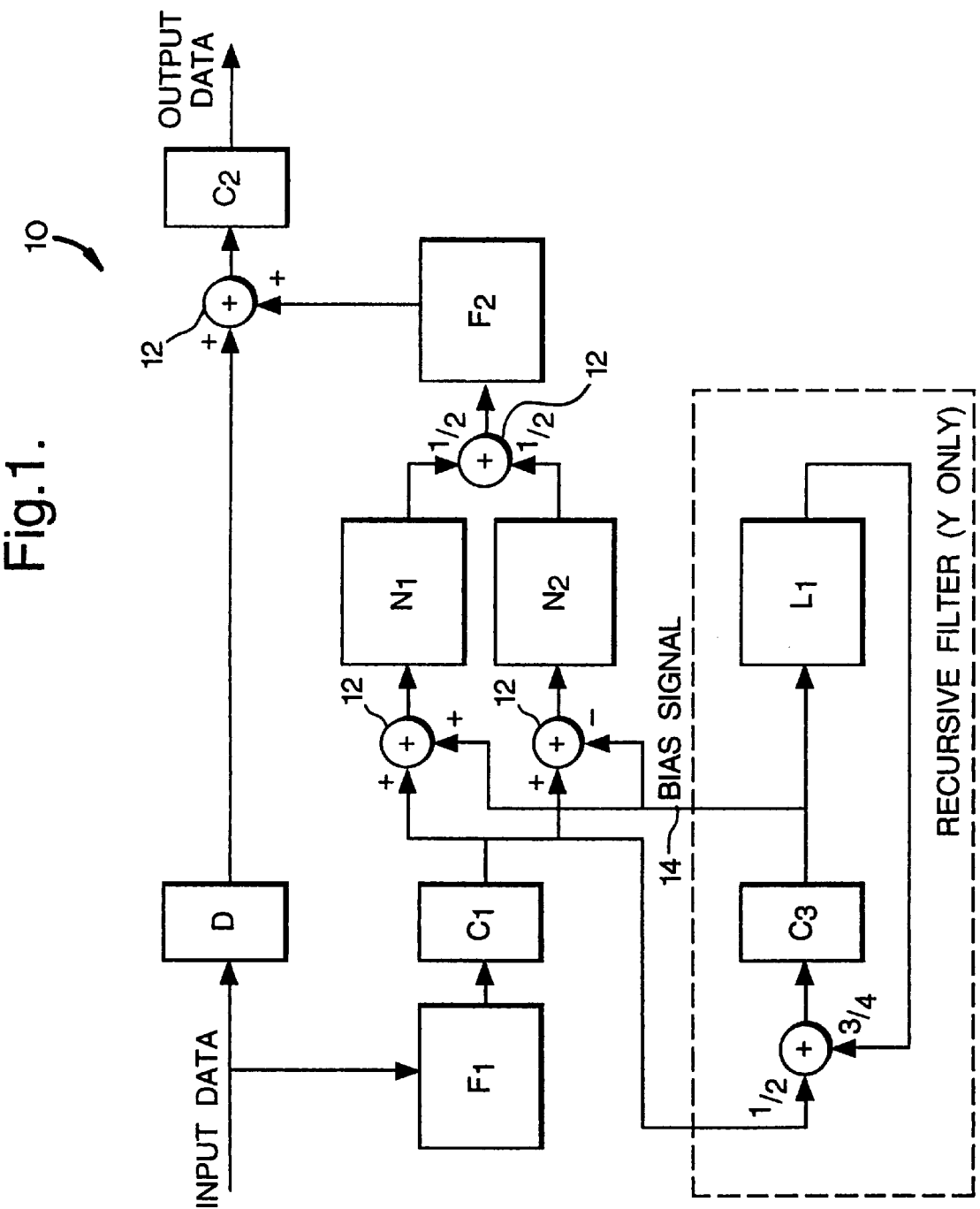
FIG. 1 is a block diagram of an Edge Enhanced Noise Reduction system according to one aspect of the present invention.

FIG. 1 shows the block diagram of the EENR system (10) of the present invention. The system comprises a number of functional blocks, particularly, two high pass Hilbert transform filters $F_1$ and $F_2$, and two identical non-linear tables $N_1$ and $N_2$. Three hard clip functions $C_1$, $C_2$ and $C_3$ are provided to reduce the number of bits required at the points where the clip functions operate. A line delay $L_1$ and a compensating delay D are also provided in the circuit. In the situation where the system operates without a recursive filter, since the two non-linearities are identical, $N_1$ and $N_2$ can be replaced by a single non-linearity N and the summation blocks (12) removed.

Low frequency signals do not pass through $F_1$ and appear only through the direct path at the output of the circuit. High frequency signals pass both through $F_1$, N and $F_2$ (the HF path) and the direct path. For low amplitude signals the gain through the HF path approximates to −1. This results in cancellation of these signals at the output summation block. The effect of cascading $F_1$ and $F_2$ is to produce a linear phase high pass filter which when added to the direct path produces a complementary low pass filter. It is the resulting low pass response which removes the noise. For larger amplitude signals, the gain of the HF path progressively descreases to zero, so that at full amplitude the HF path has virtually no effect.

The blocks $C_3$ and $L_1$ constitute a vertical recursive filter operating on the high pass data from $F_1$. The purpose of the vertical recursive filter is to reduce the degree of noise reduction applied to low amplitude vertical edges in the picture. Vertical edges are the edges found within the picture, for example a wall or a tree trunk. Edge details are very important for preserving subjective picture quality, and also help in the motion estimation process. Vertical edge details accumulate in the filter while random noise is averaged out. The filter generates a bias signal which changes the combined shape of N by adding an offset between $N_1$ and $N_2$. This effects the degree of noise reduction performed across the edge transition. The bias signal (14) and hence the signal from the recursive filter can not appear directly as an output signal in the HF path and can only effect the severity of the noise reduction.

Figure 2:
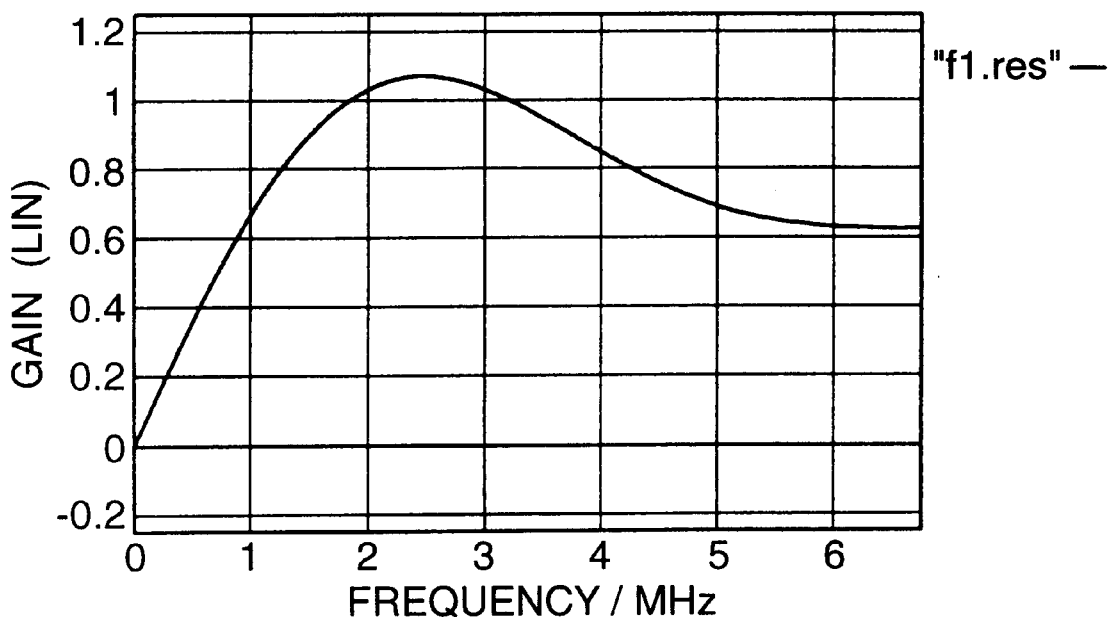
FIG. 2 is a graph showing the frequency response of a Hilbert Transform Filter of the FIG. 1 system.

The filter $F_1$ is a six-tap Hilbert Transform Filter having the following coefficients:

$C_2 = -\frac{1}{16}$
$C_2 = -\frac{4}{16}$
$C_1 = -\frac{8}{16}$
$C_{-1} = \frac{8}{16}$
$C_{-2} = \frac{4}{16}$
$C_{-3} = \frac{1}{16}$ The frequency response of the filter $F_1$ is shown in FIG. 2. The filter contains a peak in the frequency response at about 2.5 MHz (with a 13.5 MHz sampling rate). This maximises the sensitivity to edge detail and reduces the sensitivity to noise.

The purpose of $C_1$ is the limit the amplitude of the output of $F_1$ to ±0.25V, assuming the input range is scaled to unity (1V 256 units, black level=16, peak white=235). This results in reduction of the size of the non-linearity look-up table required. Signals having an amplitude of about one third full amplitude will cause $C_1$ to clip, but since the gain through the high pass path will be near zero this is of no significant consequence.

The non-linearities used for EENR are based on those used on the Compatible Non-linear Pre-emphasis for MAC signals (IBA report 141/89). Although the curve represented here cannot be represented empirically, the following 'C' function uses a Newton-Raphson iteration to derive the two identical non-linearities $N_1$ & $N_2$.

```
#include <math.h>
#define SMALL 1e-6
double nonlind(double v)
{
    double vl, v2;
    static struct nonlin
        {double a, b, c; }nld =
        {0.00300, 35.0, 1.800 };
    vl = v/nld.c;
    do
    {
```

-continued

```
        v2 = exp(nld.b * (v - v1));
        v2 = (nld.a * (v2 - 1/v2) - vl)
            /(nld.a * nld.b * (v2 + 1/v2) + 1)
        vl += v2;
    }
    while (fabs(v2) > SMALL);
    v2 =2 * (vl * nld.c - v);
    return(v2);
}
```

Figure 3:
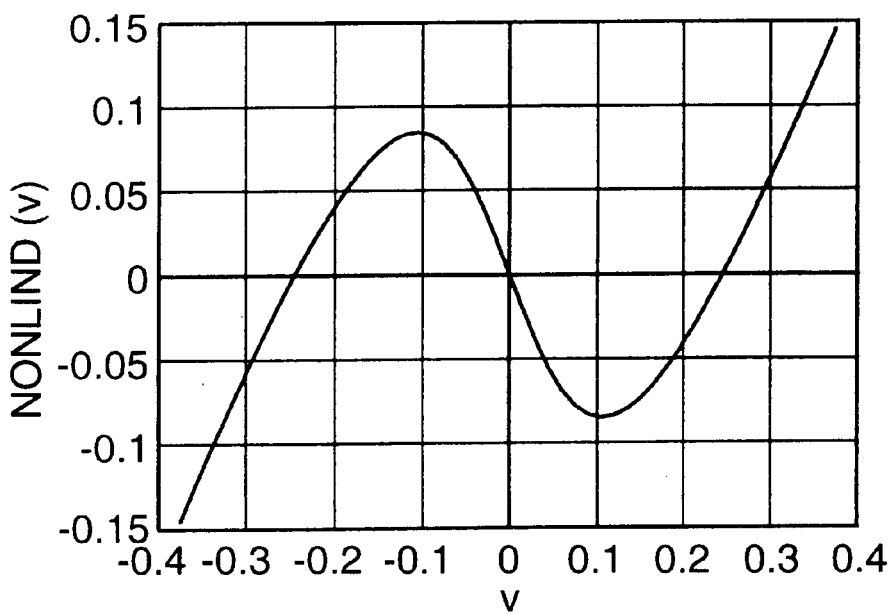
FIG. 3 is a graphical representation of the non-linear function introduced by the FIG. 1 system.

The non-linear function resulting from the above iteration is shown in FIG. 3. The slope of this function near the origin is greater than −1 to compensate for the losses in the cascaded response of filters $F_1$ & $F_2$. For large amplitude signals the average slope is zero. Some harmonic distortions occurs at this point and in the preceding clip function $C_1$ which could alias down to DC and become visible, but this is removed by filter $F_2$.

The second filter $F_2$ is a two-tap Hilbert Transform Filter having the following coefficients:

$C_1 = -\frac{1}{2}$
$C_{-1} = \frac{1}{2}$

Figure 4:
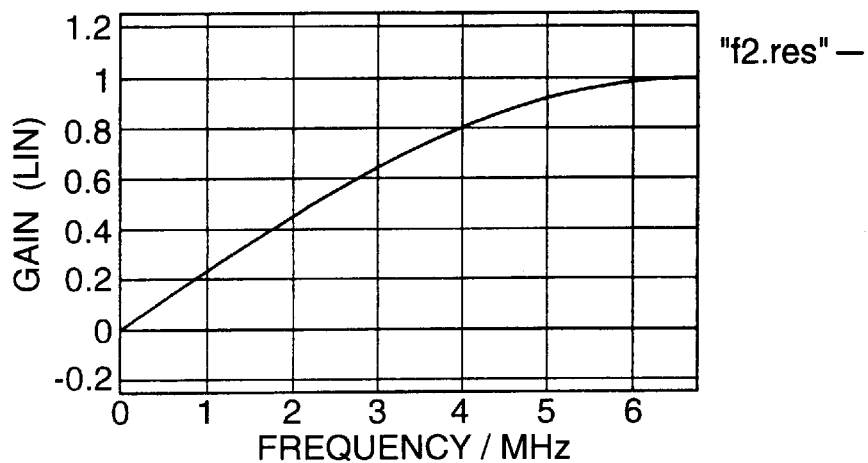
FIG. 4 is a graph showing the frequency response of a second Hilbert Transform Filter of the FIG. 1 system.

The frequency response of the filter $F_2$ is shown in FIG. 4.

Figure 5:
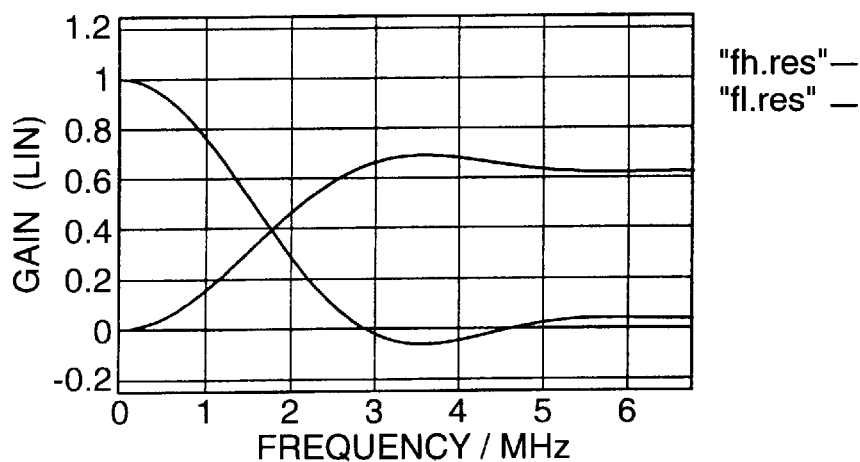
FIG. 5 is a graphical representation of the frequency response of the system.

The cascaded response of both filters produces a high pass response as is shown in FIG. 5. By including the gain that is present of N for low signal amplitudes, the total low pass frequency response of the whole network is created.

The combined effect of the direct path and the HF path can produce summation signals at the output which exceed the range 0 to 1V. It is the purpose of $C_2$ is to limit the output range of this signal.

The line delay $L_1$ has the effect of forming the recursive filter. The delay in $L_1$ is set to ensure that the delay round the loop $C_3$, $L_1$ and the summation block constitute exactly one line. Every time the loop is circumvented three-quarters of the delayed signal and half the signal from $F_1$ are added together. This produces a gain of two at zero vertical frequency.

Figure 6:
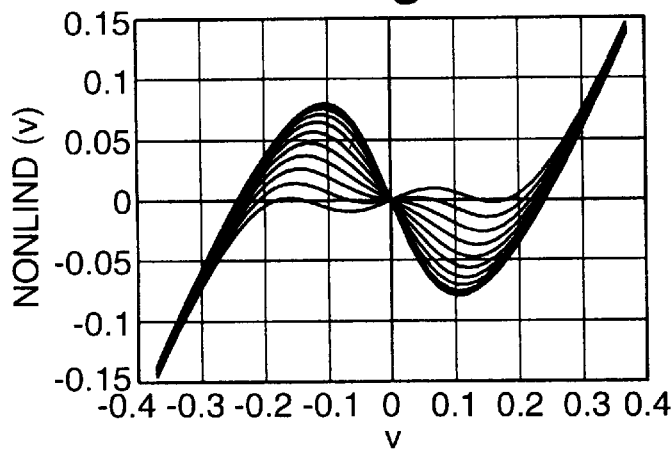
FIG. 6 is a graphical representation showing the combined non-linearity of the system.

The clip function $C_3$ further reduces the signal amplitude around the recursive filter to about ±0.125V. This is the value required for the bias signal to reduce the effect of $N_1$ and $N_2$ to be near zero, and the inclusion of this in the feedback path prevents large amplitude edges from taking several lines to decay to insignificant levels in the recursive filter. The effect of the bias signal on combined non-linearity is shown in FIG. 6.

FIGS. 7 and 8 show the level of improvement possible in this system. A picture 'Goldhill' which is 720×576 in resolution, has had a modest amount of source noise added to the source. This noise is slightly triangular (about +4 dB lift at 4.5 MHz). FIG. 7 shows the effect of MPEG encoding the 'I' frame. The total sequence is at a bit rate of 3 Mbits/s. As can be seen DCT artefacts are visible in the picture. FIG. 8 is the same picture at the same bit rate with EENR present in the chain. The amount of the DCT artefacts is less and more detail is visible as data capacity is not wasted on noise.

EENR has been designed to operate in an MPEG I or II transmission system operating with constrained bit rates on picture material which has been originated from imperfect sources. In this situation, worthwhile improvements in picture quality are possible. EENR requires about 5000 gates to implement in ASIC or FPGA technology (excluding the line delay) and can be incorporated in an MPEG encoder with minimal changes to the existing design.

Edge Enhanced Noise Reduction (EENR) is a frequency dependent instantaneous compander system. It is applied only in the encoder both to Chrominance and luminance, and is best placed after the horizontal and vertical down sampling filters in the pre-processing stages of an encoder (not shown per se). High frequency, low level information (mainly noise) are reduced significantly in amplitude. In particular, EENR is designed to preserve edge details. In addition, a vertical recursive filter can be used to prevent low level vertical information from being removed by the system. This is partially useful in the luminance path. High level, high frequency components remain virtually unaffected. The system is 'transparent' to low frequency information.

EENR has been designed to work in conjunction with MPEG encoding presented with source material which is slightly noisy and where the transmission bit rate is being constrained. It has been designed to provide minimal loss in picture quality due to the noise reduction process itself. It is not necessary to provide a complementary process in the receiver.

I claim:

1. A system for noise reduction comprising:
   a Hilbert transform filter for applying a first level of filtering to a first level of filtering to a first type of feature of an image and a second level of filtering to a second level of filtering to a second type of feature of the image, wherein the second type of feature is edge elements of the image; and
   a means for applying a non-linearity, such that low-level noise is reduced within the system.

2. The system of claim 1, wherein the second type feature is low amplitude edge elements of the image.

3. The system of claim 2, wherein the edge elements comprise vertical edge elements of the image.

4. The system of claim 3, further comprising a vertical recursive filter for reducing the degree of noise reduction applied to low amplitude vertical edges of the image.

5. The system of claim 4, wherein the recursive filter comprises a line delay and a clipping function.

6. A system for noise reduction comprising:
   a filter for applying a first level of filtering to a first level of filtering to a first type of feature of an image and a second level of filtering to a second level of filtering to a second type of feature of the image, wherein the filter comprises two filters cascaded together to produce high pass linear phase filtering, and wherein the second type of feature is edge elements of the image; and
   a means for applying a non-linearity, such that low-level noise is reduced within the system.

7. The system of claim 6, wherein one of the two filters is before the means for applying the non-linearity and the other of the two filters is after the means for applying the non-linearity.

8. The system of claim 6, wherein one of the two filters is a six-tap Hilbert transform filter and the other of the two filters is a two-tap Hilbert transform filter.

9. A system for noise reduction comprising:
   a filter for applying a first level of filtering to a first level of filtering to a first type of feature of an image and a second level of filtering to a second level of filtering to a second type of feature of the image, wherein the second type feature is edge elements of the image; and
   a means for applying a non-linearity produced by a Newton-Ralphson iteration, such that low-level noise is reduced within the system.

10. An encoder including a system for noise reduction comprising:
    a Hilbert transform filter for applying a first level of filtering to a first level of filtering to a first type of feature of an image and a second level of filtering to a second level of filtering to a second type of feature of the image, wherein the second type of feature is edge elements of the image; and
    a means for applying a non-linearity, such that low-level noise is reduced within the system.

11. An encoder including a system for noise reduction comprising a filter for applying a first level of filtering to a first level of filtering to a first type of feature of an image and a second level of filtering to a second level of filtering to a second type of feature of the image, wherein the filter comprises two filters cascaded together to produce high pass linear phase filtering, and wherein the second type of feature is edge elements of the image; and
    a means for applying a non-linearity, such that low-level noise is reduced within the system.

12. An encoder including a system for noise reduction comprising:
    a filter for applying a first level of filtering to a first level of filtering to a first type of feature of an image and a second level of filtering to a second level of filtering to a second type of feature of the image, wherein the second type of feature is edge elements of the image; and
    a means for applying a non-linearity produced by a Newton-Ralphson iteration, such that low-level noise is reduced within the system.

13. A video compression system including a system for noise reduction comprising:
    a Hilbert transform filter for applying a first level of filtering to a first level of filtering to a first type of feature of an image and a second level of filtering to a second level of filtering to a second type of feature of the image, wherein the second type of feature is edge elements of the image; and
    a means for applying a non-linearity, such that low-level noise is reduced within the system.

14. A video compression system including a system for noise reduction comprising:
    a filter for applying a first level of filtering to a first level of filtering to a first type of feature of an image and a second level of filtering to a second level of filtering to a second type of feature of the image, wherein the filter comprises two filters cascaded together to produce high pass linear phase filtering, and wherein the second type of feature is edge elements of the image; and
    a means for applying a non-linearity, such that low-level noise is reduced within the system.

15. A video compression system including a system for noise reduction comprising:
    a filter for applying a first level of filtering to a first level of filtering to a first type of feature of an image and a second level of filtering to a second level of filtering to a second type of feature of the image, wherein the second type of feature is edge elements of the image; and
    a means for applying a non-linearity produced by a Newton-Ralphson iteration, such that low-level noise is reduced within the system.

16. A method for reducing noise comprising:
    applying a Hilbert transform filter for performing a first level of filtering to a first level of filtering to a first type of feature of an image and a second level of filtering to a second level of filtering to a second type of feature of the image, wherein the second type of feature is edge elements of the image; and applying a non-linearity, such that low level noise is reduced within the system.

17. A method for reducing noise comprising:

applying a cascade filter for a first level of filtering to a first level of filtering to a first type of feature of an image and a second level of filtering to a second level of filtering to a second type of feature of the image, wherein the cascade filter comprises two filters cascaded together to produce high pass linear phase filtering and wherein the second type of feature is edge elements of the image; and applying a non-linearity, such that low level noise is reduced within the system.

18. A method of reducing noise comprising:

applying a filter for performing a first level of filtering to a first level of filtering to a first type of feature of an image and a second level of filtering to a second level of filtering to a second type of feature of the image, wherein the second type of feature is edge elements of the image; and applying a non-linearity produced by a Newton-Ralphson iteration, such that low level noise is reduced within the system.

\* \* \* \* \*